(12) United States Patent
Geringswald et al.

(10) Patent No.: US 11,459,183 B2
(45) Date of Patent: Oct. 4, 2022

(54) POUCH FEEDING ASSEMBLY FOR FILL AND SEAL POUCHING MACHINE

(71) Applicant: BARTELT PACKAGING LLC, Covington, KY (US)

(72) Inventors: Nathan Geringswald, Bradenton, FL (US); Adam Freed, Sarasota, FL (US)

(73) Assignee: BARTELT PACKAGING LLC, Covington, KY (US)

( * ) Notice: Subject to any disclaimer, the term of this patent is extended or adjusted under 35 U.S.C. 154(b) by 14 days.

(21) Appl. No.: 17/223,760

(22) Filed: Apr. 6, 2021

(65) Prior Publication Data

US 2021/0316947 A1 Oct. 14, 2021

Related U.S. Application Data

(60) Provisional application No. 63/007,030, filed on Apr. 8, 2020.

(51) Int. Cl.
| | |
|---|---|
| *B65G 43/10* | (2006.01) |
| *B65G 47/56* | (2006.01) |
| *B65B 43/52* | (2006.01) |

(52) U.S. Cl.
CPC .......... *B65G 43/10* (2013.01); *B65G 2201/02* (2013.01); *B65G 2203/042* (2013.01)

(58) Field of Classification Search
None
See application file for complete search history.

(56) References Cited

U.S. PATENT DOCUMENTS

| | | | | |
|---|---|---|---|---|
| 4,510,736 A | * | 4/1985 | Muller | B65B 1/02 53/284.7 |
| 4,982,556 A | * | 1/1991 | Tisma | G07F 17/0092 53/154 |
| 5,460,258 A | * | 10/1995 | Tisma | B65G 47/5122 198/429 |
| 5,630,311 A | * | 5/1997 | Flix | B65B 21/06 198/459.8 |
| 7,104,027 B2 | * | 9/2006 | Ford | B65B 5/106 53/244 |
| 10,850,879 B2 | * | 12/2020 | Bellante | B65B 35/405 |

* cited by examiner

Primary Examiner — Kavel Singh
(74) Attorney, Agent, or Firm — Thompson Hine LLP (57) ABSTRACT

A pouch feeding assembly includes a conveyor lane having a load end and a transfer end, wherein the conveyor lane includes a conveyor operable to move pouches in a conveyance direction from the load end to the transfer end, wherein the transfer end of the conveyor lane includes a downwardly facing pouch transfer window over which pouches at the transfer end are positioned. A transfer subassembly including a first transfer mechanism and a second transfer mechanism, the first transfer mechanism configured to engage a lower face of a pouch, pull at least part of the pouch down through the pouch transfer window and transfer the pouch to an infeed point of the second transfer mechanism.

11 Claims, 12 Drawing Sheets

POUCH FEEDING ASSEMBLY FOR FILL AND SEAL POUCHING MACHINE

TECHNICAL FIELD

The present invention relates to pouching machines, and more particularly to assemblies for feeding pre-formed pouches to horizontal fill and seal pouching machines.

BACKGROUND

Horizontal pouching machines generally come in two varieties: fill and seal machines; and form, fill and seal machines. In the latter variety of machines, a film of packaging material (e.g., plastic) is fed to the machine, which cuts and partially seals the film to form open pouches. The formed pouches are moved to one or more filling stations and, after filling, completely sealed. As the difference in the names, suggests, a fill and seal pouching machine does not include a pouch forming component. Instead, pre-formed pouches are transferred to the machine, which then fills and seals them.

The pre-formed pouches typically arrive in boxes, which are manually unloaded onto a conveyor in a generally horizontal orientation. The conveyor transfers the pouches to an infeed station, where each pouch must be shifted to a vertical orientation and moved into a position to be grasped by the pouching clamps which will convey the pouch to the filling and sealing stations. To ensure proper filling and sealing, there is relatively little tolerance for deviation in the position in which each pouch is presented to the pouching clamps. Generally, this requires very carefully positioning the unloaded pouches, often in an overlapped or "shingled" configuration, with the top edge of the uppermost pouch leading, by the personnel performing the manual unloading. This process is both time consuming and difficult to quickly and accurately execute, because of the hidden top edge of the successive pouch in the sequence. The ability to position the pouches, bottom pouch leading, with significant variances in spacing, would be desirable.

Further complicating matters, many pouching machines include multiple filling and sealing stations, allowing multiple pouches to be filled and sealed simultaneously. In such machines, pouches are advanced in groups of two or more, corresponding to the number of stations. For infeed, this means that multiple pouches must be presented to multiple sets of clamps at the same time and in the same position by multiple infeed stations. Consequently, the pre-formed pouches must be manually unloaded onto multiple conveyors which will work in parallel to supply the pouches to the multiple infeed stations, which in turns multiplies the manual unloading effort and corresponding chances for error.

It would be desirable to provide a feed system comprised of a pouch supply magazine and transfer pouch gripper assemblies with improved design and consistent performance.

SUMMARY

In view of the forgoing, it is an object of the present invention to provide an improved pouch feeding assembly. In particular, a pouch feeding assembly according to the present invention supplies pouches at a consistent interval to an vertical transfer subassembly while compensating for inconsistent positioning of unloaded pouches. According to a further aspect, a pouch infeed assembly according to the present invention provides synchronized supply of pouches to a plurality of infeed subassemblies while compensating for both inconsistent positioning of unloaded pouches supplied to a given vertical transfer subassembly and inconsistent positioning of unloaded pouches between those fed to different infeed subassemblies. These and other objects, aspects and advantages of the present invention will be better appreciated in view of the drawings and following detailed description of preferred embodiments.

In one aspect, a pouch feeding assembly includes: a conveyor lane having a load end and a transfer end, wherein the conveyor lane includes a conveyor operable to move pouches in a conveyance direction from the load end to the transfer end, wherein the transfer end of the conveyor lane includes a downwardly facing pouch transfer window over which pouches at the transfer end are positioned; and a transfer assembly including a first transfer mechanism and a second transfer mechanism, the first transfer mechanism configured to engage a lower face of a pouch, pull at least part of the pouch down through the pouch transfer window, which may include edge control tabs, and transfer the pouch to an infeed point of the second transfer mechanism.

In another aspect, a method of feeding pouches to a filling machine involves: conveying pouches along a conveyor lane to a transfer end of the conveyor lane, wherein the transfer end includes a downwardly facing pouch transfer opening; supporting a first pouch over the pouch transfer opening; and moving a first transfer mechanism to move upward into engagement with a lower face of the first pouch, the first transfer member gripping the lower face by suction, and then moving the first transfer mechanism downward to pull the first pouch down through the pouch transfer window and into a position below the conveyor lane. The method may also involve moving the first transfer mechanism horizontally and vertically to position a leading edge of the first pouch in a position to be engaged between a pinch roller and a conveyor for further feeding of the first pouch.

The details of one or more embodiments are set forth in the accompanying drawings and the description below. Other features, objects, and advantages will be apparent from the description and drawings, and from the claims.

DETAILED DESCRIPTION

Figure 1:
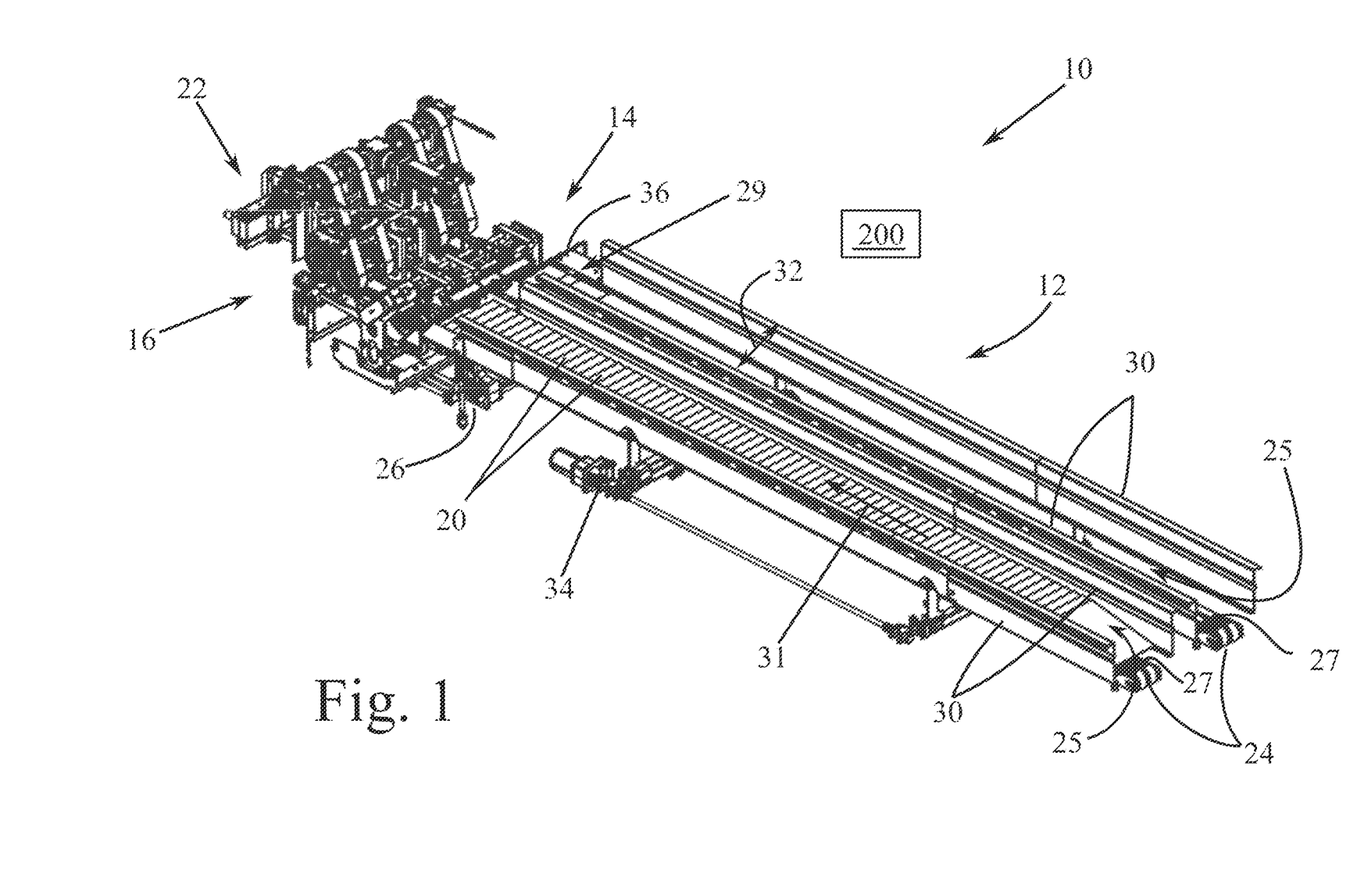
FIG. 1 is a perspective view of a pouch feeding assembly according to an embodiment of the present invention, including a conveyor subassembly, an intermediate transfer subassembly and an vertical transfer subassembly.

Referring to FIG. 1, a pouch feeding assembly 10, according to an embodiment of the present invention, includes a conveyor subassembly 12, an intermediate transfer subassembly 14 and an vertical transfer subassembly 16. A plurality of pouches 20 are unloaded onto the conveyor subassembly 12 for delivery to the intermediate transfer subassembly 14. The intermediate transfer subassembly 14 operates to ensure supply of the pouches 20 at a controlled interval to the vertical transfer subassembly 16. The vertical transfer subassembly 16 transitions the pouches 20 from a horizontal to a vertical orientation and delivers the pouches 20 to a controlled location for reception by a fill and seal machine 22 (only a small portion of which is shown for economy and clarity of illustration).

In the depicted embodiment, the pouch feeding assembly 10 is configured to deliver to pouches 20 simultaneously to the fill and seal machine 22. Accordingly, each of the subassemblies 12, 14 and 16 has two parallel channels for pouches 20. It will be appreciated, however, that a pouch feeding assembly according to the present invention could readily be adapted to simultaneously supply any number of pouches to a fill and seal machine. Likewise, a pouch feeding assembly according to the present invention could be configured to supply only one pouch at a time to a fill and seal machine.

Each channel of the conveyor subassembly 12 includes a belt conveyor 24 for advancing the pouches 20 toward the intermediate transfer subassembly 14. Where the pouch feeding assembly includes multiple channels, each belt conveyor 24 preferably has its own independent drive 26.

Each channel of the conveyor subassembly 12 further includes a pair of sidewalls 30, which having a spacing 32 corresponding to a width of the pouches 20. This ensures a controlled lateral position of the pouches 20 supplied to the intermediate transfer assembly 14. The spacing 32 between the sidewalls 30 is preferably adjustable via one or more drives 34 to correspond to differing pouch widths.

The one or more drives 34 could be shared between multiple channels to adjust the sidewall spacings 32, since the multiple channels of a pouch feeding machine will virtually always be used to supply identically dimensioned pouches to a fill and seal machine. A stop gate 36 is located at the terminal end of each channel to prevent the belt conveyors 24 from advancing pouches beyond a predetermined point.

Figure 2:
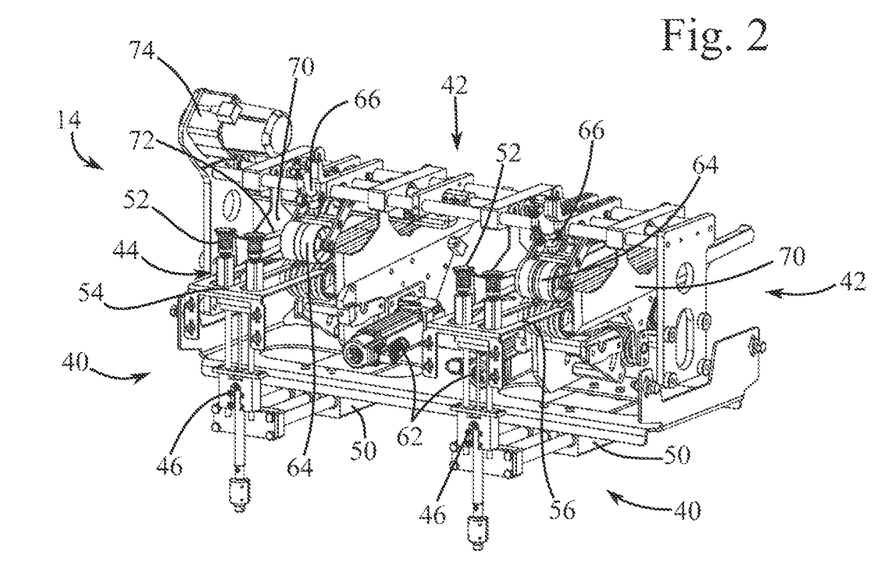
FIGS. 2 and 3 are perspective views of the intermediate transfer subassembly of FIG. 1.
Figure 3:
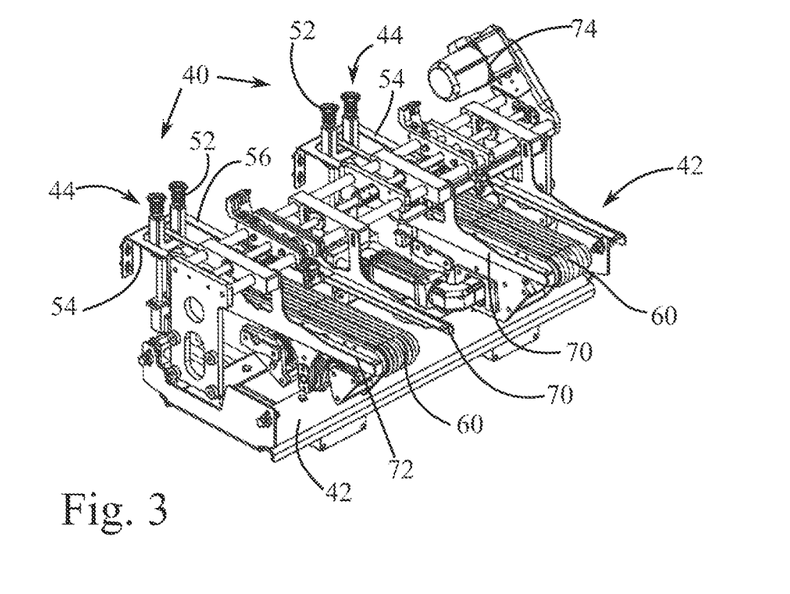

Referring to FIGS. 2 and 3, the intermediate transfer subassembly 14 includes first and second transfer mechanisms 40, 42 for each channel of the pouch feeding assembly 10. Each first transfer mechanism 40 is independently operable to advance a pouch 20 forwardly and downwardly from the acquisition point proximate the stop gate 36 of the conveyor subassembly 12 to an acquisition point of the second transfer mechanism 42. Each second transfer mechanism 42 is independently operable to advance the pouch 20 from its acquisition point to an acquisition point for a corresponding channel of the vertical transfer subassembly 16.

Preferably, each first transfer mechanism 40 includes a suction gripping arrangement 44 movable by a vertical drive 46 and a horizontal drive 50. Advantageously, each suction gripping arrangement 44 includes multiple suction cups 52. Each first transfer mechanism 40 further includes a lower guide 54, which prevents the pouch 20 from dropping below a level of the acquisition point of the second transfer mechanism 42. Passages 56 are defined in each lower guide 54 to accommodate horizontal and vertical movement of the suction gripping arrangements, and variances in acquired pouch form.

Each second transfer mechanism 42 includes a belt conveyor 60 advanced by its own drive 62. A pinch roller 64 is pivotable downwardly by its own drive 66 to urge the pouch 20 into engagement with the belt conveyor 60 at the acquisition of the second transfer mechanism 42. The pinch roller 64 is preferably not directly powered to rotate about its axis, but rather rotates freely in response to the motion of the pouch 20 and/or belt conveyor 60. Sidewalls 70 of each second transfer mechanism 42 include upper guide rails 72, which help guide the pouch 20 toward the belt conveyor 60 at the acquisition point and maintain the pouch in engagement with the belt conveyor 60 thereafter.

The sidewalls 70 are laterally spaced to match the spacing 32 of the sidewalls 30 of the corresponding belt conveyor 24 of the conveyor subassembly 12 to ensure proper lateral position of the pouches 20 is maintained as the pouch is advanced from the acquisition point of the second transfer assembly 42 to the acquisition point of the vertical transfer subassembly 16. As with the conveyor subassembly 12, the spacing between the sidewalls 70 is preferably adjustable via a drive 74 to correspond to varying pouch widths. Advantageously, operator selection of a given pouch type (e.g., via an HMI or other user interface) will result in automatic adjustment of all sets of sidewalls 30, 70 to correspond to the width of the selected pouch type.

Figure 4:
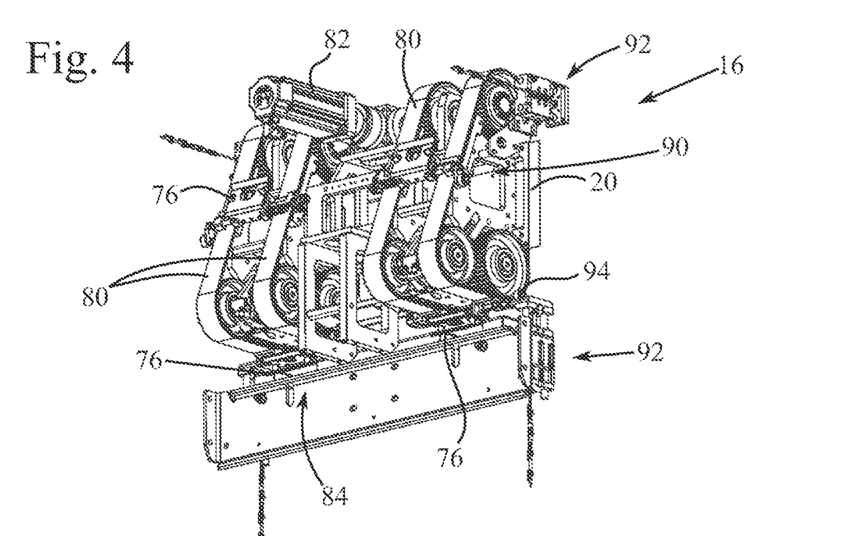
FIGS. 4 and 5 are perspective views of the vertical transfer subassembly of FIG. 1.
Figure 5:
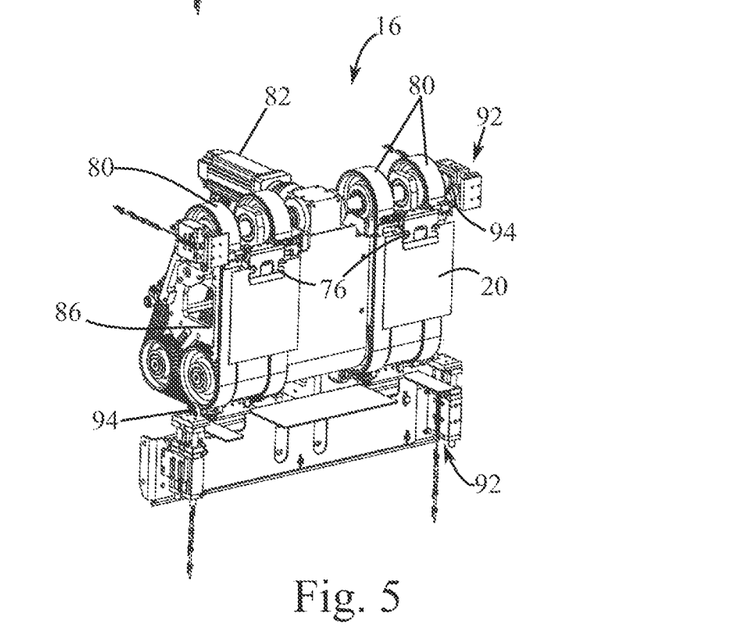

Referring to FIGS. 4 and 5, the vertical transfer subassembly 16 includes a set of three pouch clamps 76 for each channel that are fixed equidistantly to one or more drive belts 80. Via a drive 82, the drive belts 80 are driven to move the clamps in succession between predetermined acquisition and handoff points 84, 86 and an intermediate return point 90. Advantageously, a single drive 82 can be used for all drive belts 80 of different channels.

The clamps 76 are each spring-biased into a clamped state. Driven cam arrangements 92 are used at the acquisition and handoff points 84, 86 to open the clamps 76 via engagement with a respective roller arm 94 connected to each clamp 76.

Figure 6:
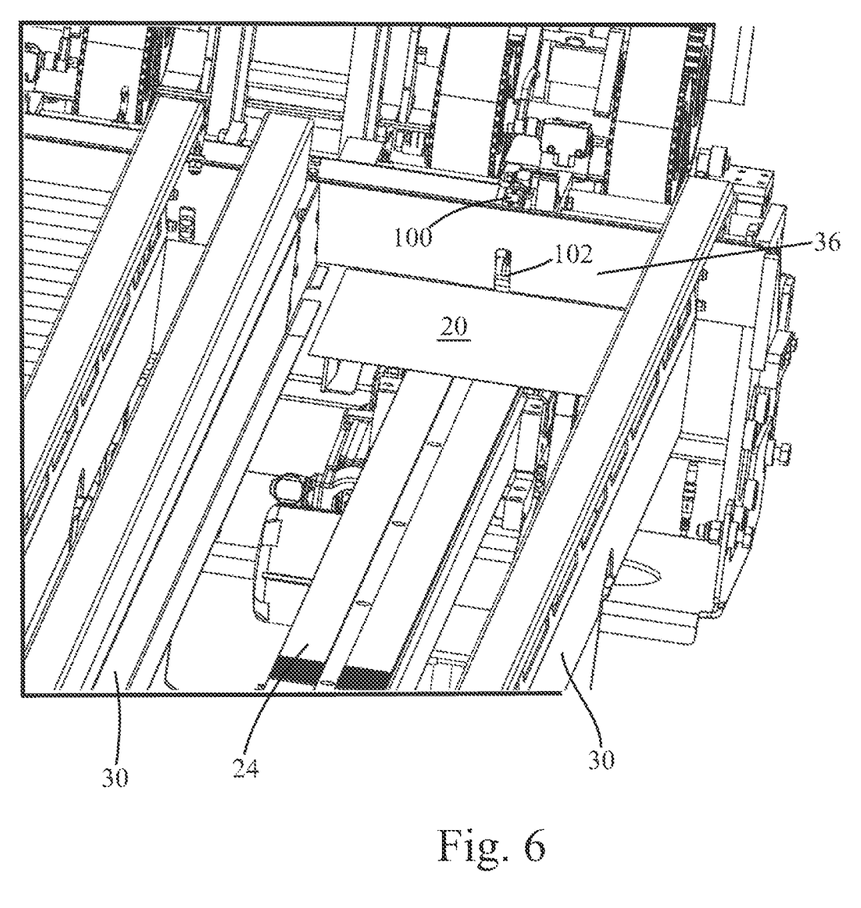
FIG. 6 is a perspective view of a pouch on the conveyor subassembly of FIG. 1, positioned for acquisition by the intermediate transfer subassembly.
Figure 7:
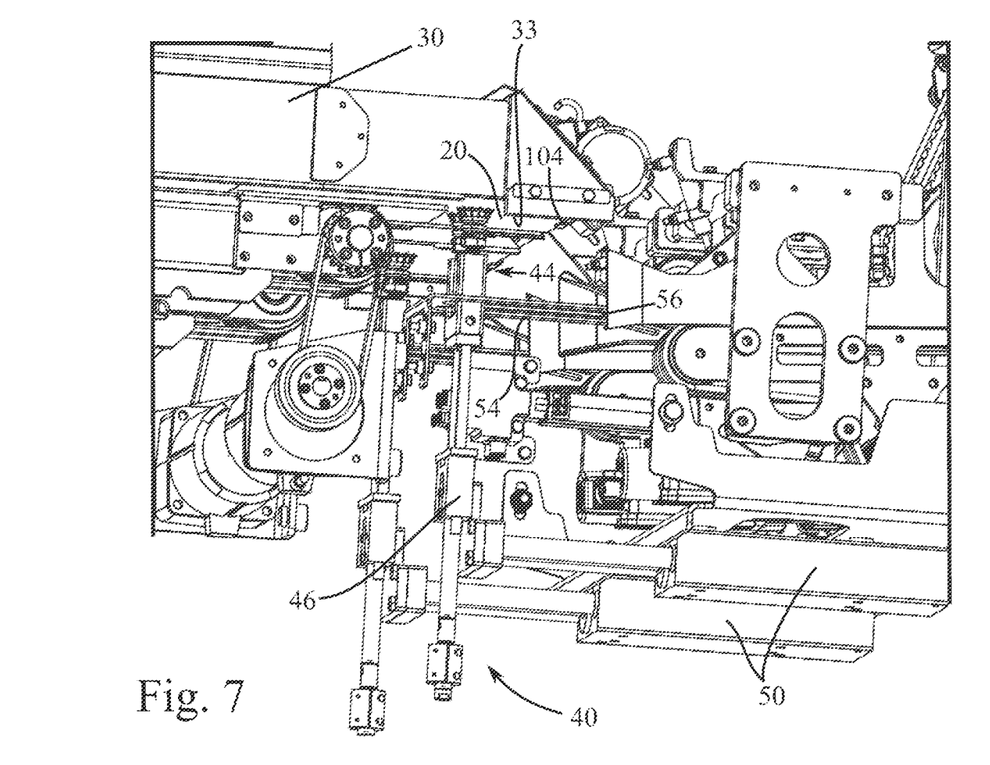
FIG. 7 is another perspective view of the pouch positioned as in FIG. 6, at the moment of acquisition by a first transfer mechanism of the intermediate transfer subassembly.

Operation of the pouch feeding assembly 10 will be described in connection with FIGS. 6-12. Referring to FIGS. 6 and 7, a pouch 20 is shown advanced to the acquisition point proximate the stop gate 36. To better show structural details of the sidewalls 30, the spacing therebetween is somewhat larger than a width of the depicted pouch 20. It will be appreciated that, in actual operation, the spacing would more closely correspond to the pouch width. The maximum width between sidewalls 20 is shown for reference.

A first pouch detection sensor 100 detects a leading edge of the pouch 20 through a slot 102 in the stop gate 36. Data from the first sensor 100 is fed to a controller 200 to effect two control functions. First, if less than a predetermined number of pouches 20 are detected at the acquisition point, the drive 26 for the belt conveyor 24 is operated to advance additional pouches 20 until the predetermined number of pouches 20 are present. Second, detection of a pouch 20 by the first sensor 100 alerts the controller that the suction gripping arrangement 44 of the first transfer mechanism 40 can be moved to retrieve the pouch 20. An additional pouch detecting sensor could be located rearwardly of the first sensor 100 to alert an operator when more pouches need to be loaded onto the conveyor subassembly 12.

Figure 14:
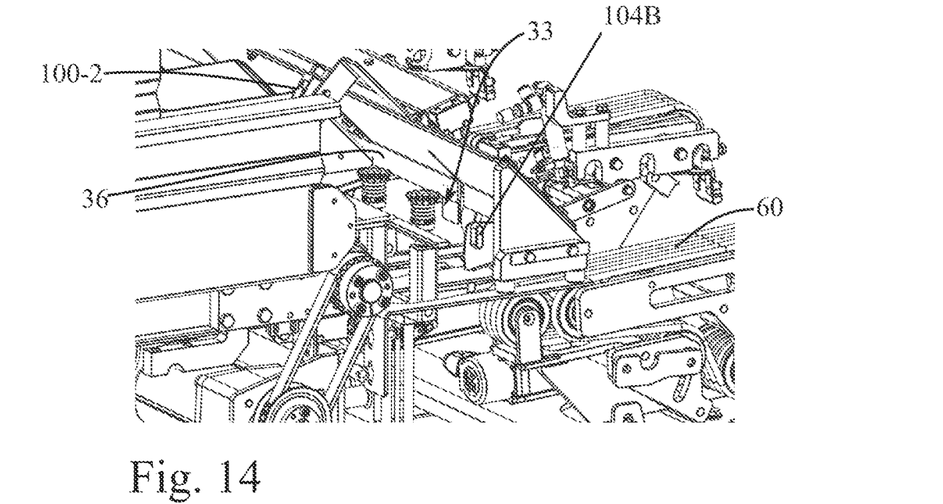
Figure 15:
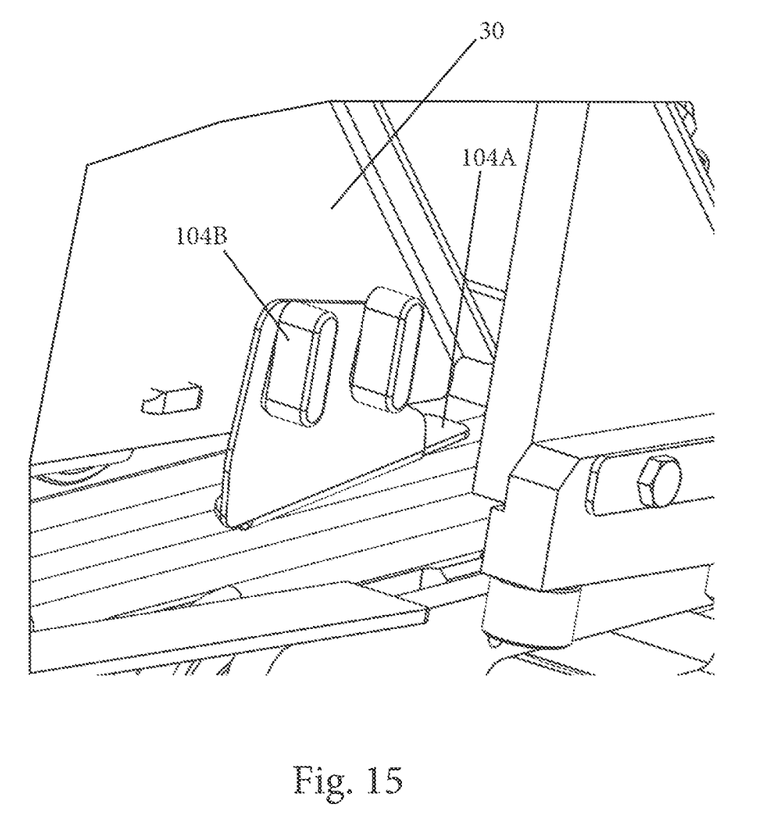

The controller operates the horizontal drive 50 to move the suction gripping arrangement 44 rearwardly to the acquisition point. The controller also operates the vertical drive 46 to move the suction gripping arrangement 44 upwardly through the passages 56 of the lower guide 54 and into engagement with the pouch 20, where suction is applied to grip the pouch. Prior to movement by the suction gripping arrangement, the leading edge of the pouch 20 is supported by tabs 104 extending from the stop gate 36. As seen in the variation of FIGS. 14 and 15, the lateral edges of the lanes may include tabs 104A that are adjustable vertically up and down by variable positioning along an end part of the sidewall 30, using releasable fasteners 104B passing through vertically oriented slots in the sidewall 30.

Figure 8:
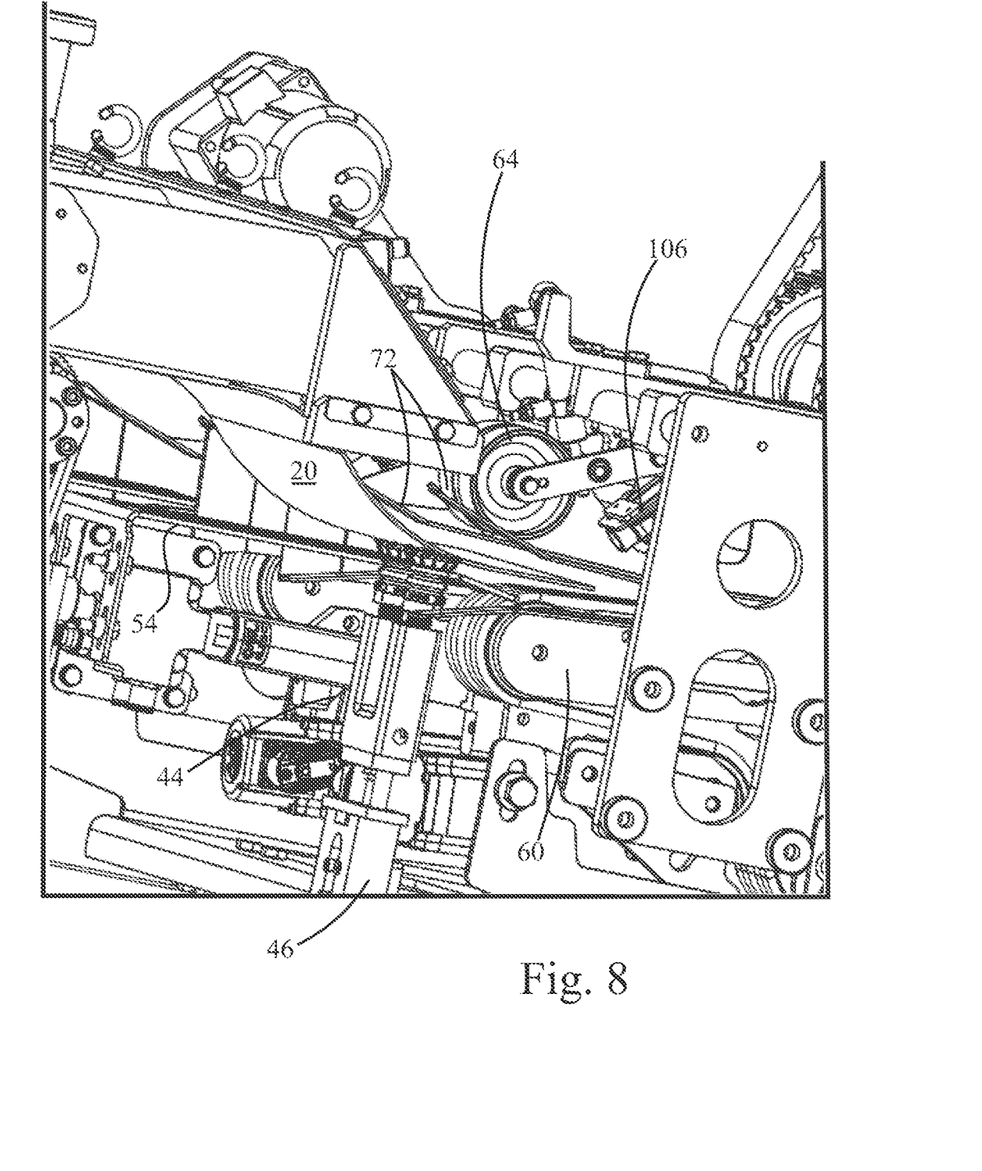
FIG. 8 is a perspective view of the pouch from FIG. 7, advanced by the first transfer mechanism to an acquisition point of a second transfer mechanism of the intermediate transfer subassembly.

After the pouch 20 is engaged by the suction gripping arrangement 44, referring to FIG. 8, the controller operates the vertical drive 46 to pull the leading edge of the pouch 20 below the tabs 104. The horizontal drive 50 is also operated to bring the leading edge of the pouch 20 to the acquisition point of the second transfer mechanism 42 between the leading edge of the belt conveyor 60 and the pinch roller 64. The lower guide 54 of the first transfer mechanism 40 and the upper guide rails 72 of the second transfer mechanism 42 also facilitate proper guidance of the pouch during this movement.

Figure 9:
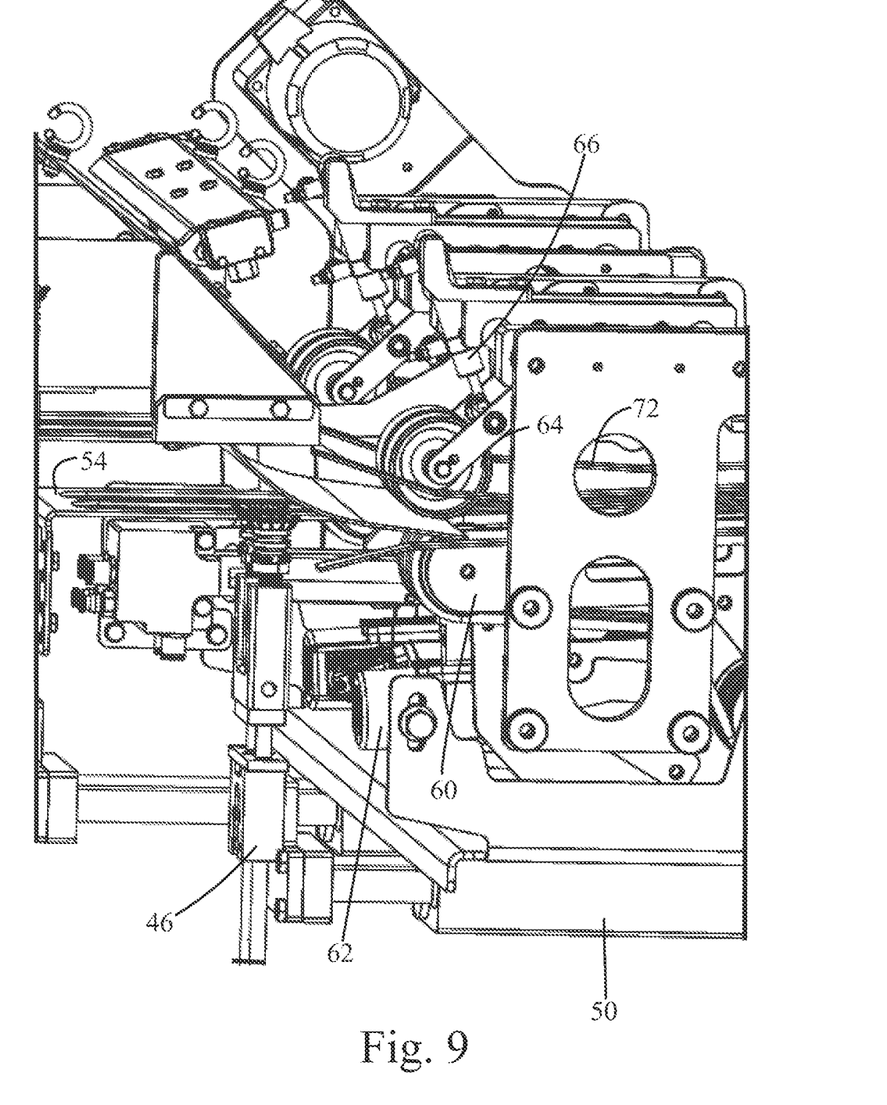
FIG. 9 is a perspective view of the pouch from FIG. 8, being acquired by the second transfer mechanism with the first transfer mechanism withdrawing.

A second pouch detection sensor 106 detects that the leading edge of the pouch 20 has reached the acquisition point of the second transfer mechanism 42. This detection triggers multiple actions by the controller. The controller operates the drive 66 to pivot the pinch roller 64 to urge the pouch 20 into engagement with the belt drive 60. The controller also releases the pouch 20 from the suction gripping arrangement 44 and operates the vertical and horizontal drives 46, 56 to lower the gripping arrangement 44 below the lower guide 54 and back toward the acquisition point of the first transfer mechanism 40. Additionally, the controller operates the drive 62 to move the pouch a predetermined distance toward the acquisition point of the vertical transfer subassembly 16.

Figure 10:
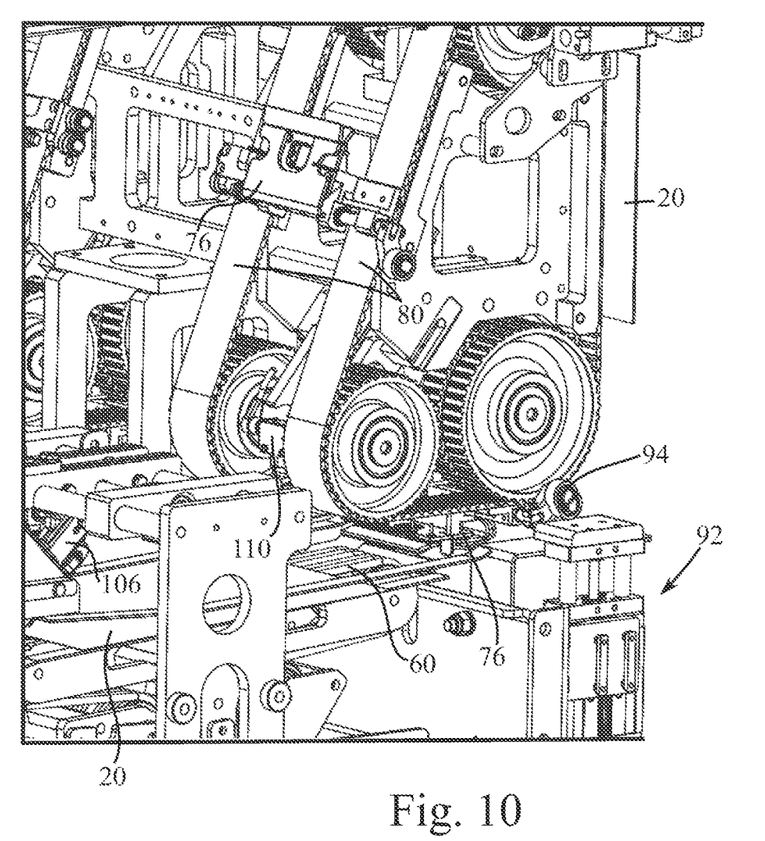
FIG. 10 is a perspective view of the pouch from FIG. 9, advanced by the second transfer mechanism toward an acquisition point of the vertical transfer subassembly.
Figure 11:
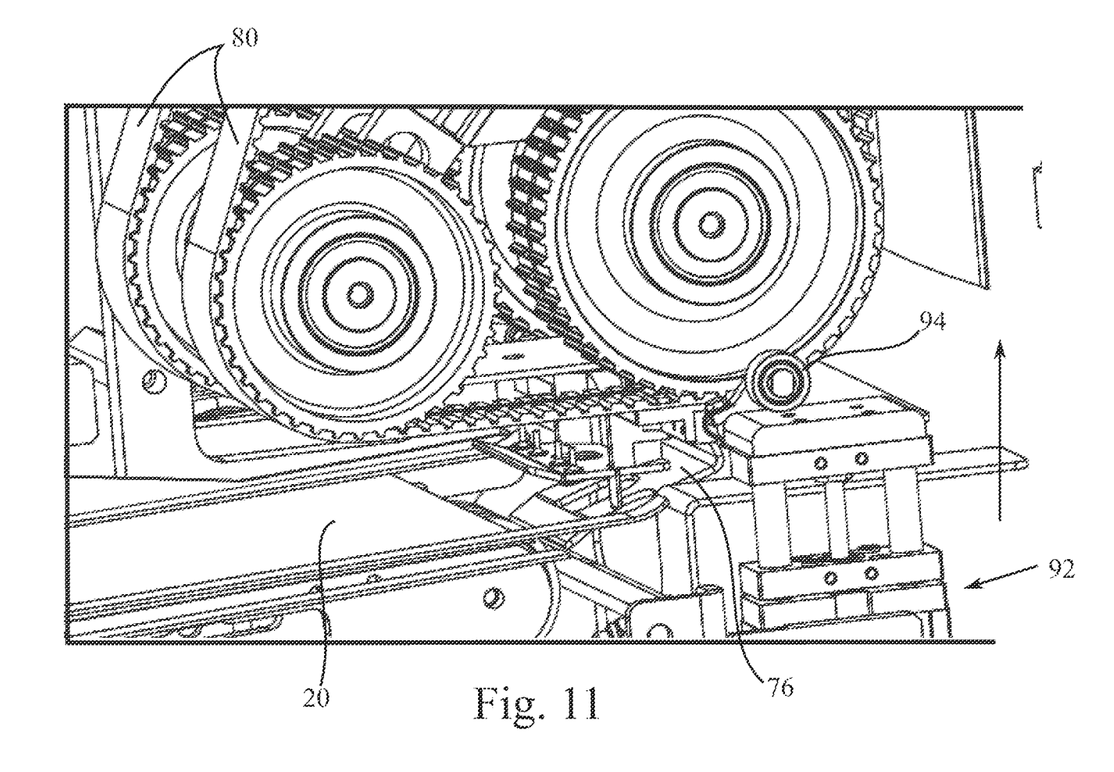
FIG. 11 is a perspective view of the pouch from FIG. 10, further advanced to the acquisition point of the vertical transfer subassembly.

Referring to FIGS. 10 and 11, the driven cam arrangement 92 urges the roller arm 94 upwardly for the clamp 76 waiting at the acquisition point of the vertical transfer subassembly 10. This opens the clamp 76 to be ready for delivery of the pouch 20.

The third pouch position sensor 110 detects arrival of the pouch 20. The controller then adjusts the operation of the drive 62 to compensate for any position error and ensure that the belt conveyor 60 advances the leading edge of the pouch 20 to a desired nominal position at a desired nominal time for reception by the clamp 76 at the acquisition point of the vertical transfer subassembly 16 (which is typically based on a desired pouch cycle rate of the fill and seal machine 22). As noted above, in a pouch feeding assembly 10 with multiple channels, each belt conveyor 60 has a separate drive 62. Thus, the controller can operate each belt conveyor 60 differently, as needed, to correct for different position variances determined for the pouch in each channel.

With a pouch 20 present at the vertical transfer subassembly 10 acquisition point for each channel in the pouch feeding machine 10, the controller lowers each driven cam arrangement 92, allowing each clamp 76 to close under spring pressure. At the acquisition point, the leading edge of the pouch 20 engages the clamp 76 when open, to be stopped and held in the desired position by vertical tab extensions that are an integral part of the clamp 76 (FIG. 11). This prevents over-advancement of the pouch 20, further limiting the possibility of position error.

Figure 12:
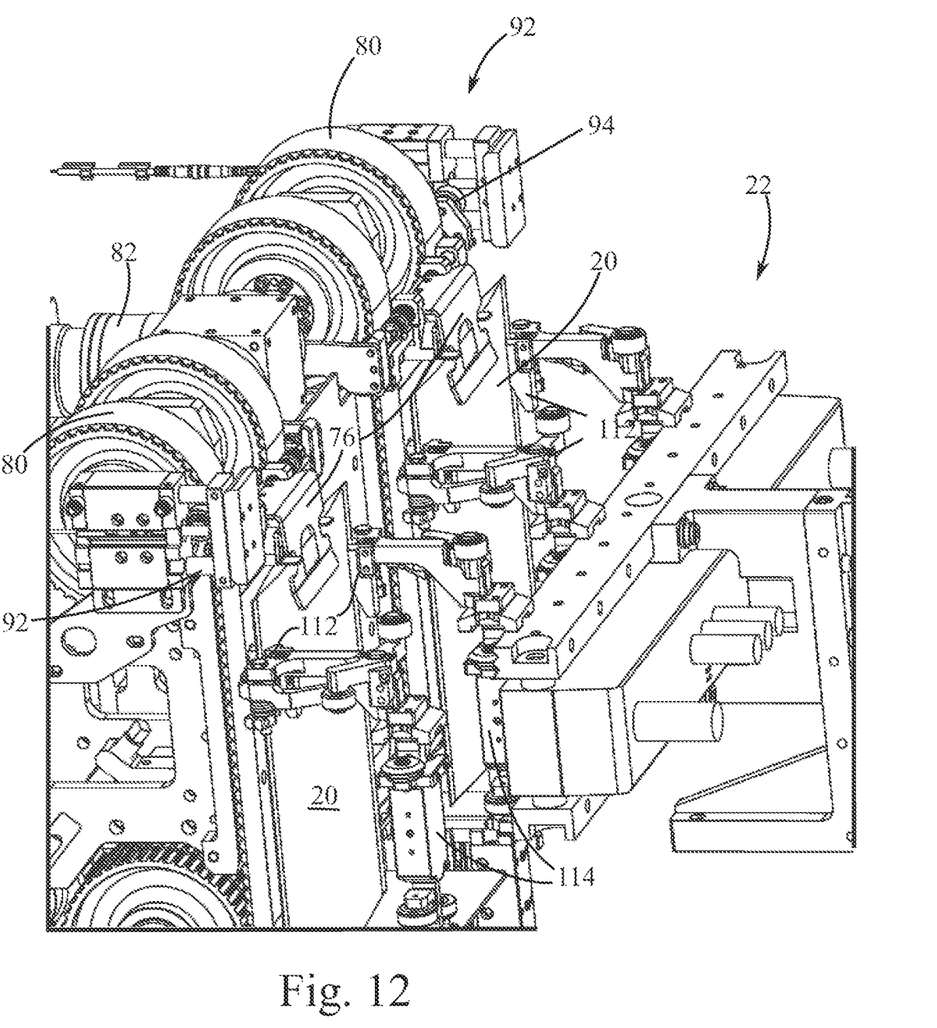
FIG. 12 is a perspective view of the pouch from FIG. 11, oriented vertically and positioned for handoff to a fill and seal machine.

Referring to FIG. 12, with the clamps 76 closed, the controller the operates the drive 82 to move the drive belts 80 and advance each clamp 76 and pouch 20 to the handoff point in a vertical orientation and between pairs of open clamps 112 of the fill and seal machine 22. At the handoff point, the pairs of clamps 112 are closed to grip opposite sides of each pouch 20. The controller operates the upper driven cam arrangements 92 to engage the roller arms 94 and open the clamps 76. The clamp carriages 114 can then move the clamps 112 and pouches to the next station of the form and fill machine and advance empty pairs of clamps 112 to the handoff point.

The above-described operation of the pouch feeding assembly 10 continues to repeat for the duration of operation of the fill and seal machine 22. Preferably, the maximum operating tempo of the assembly 10 is sufficient to equal the desired cycle rate of the pouches along the fill and seal machine 22, so that the fill and seal machine 22 is not required to operate at lower cycle rate to "wait" on the pouch feeding assembly 10.

As will be appreciated, the present invention avoids the need for time consuming precision manual loading of poaches into the conveyor subassembly—as well as any position errors induced downstream thereof—by operating the intermediate transfer subassembly to automatically compensate for position errors by the time each pouch reaches the vertical transfer subassembly.

The above-described embodiments are provided for illustrative purposes; the present invention is not necessarily limited thereto. Rather, those skilled in the art will appreciate that various modifications, as well as adaptations to particular circumstances, will fall within the scope of the invention herein shown and described.

Thus, in one implementation, the described pouch feeding assembly 10 includes multiple conveyor lanes 25, each conveyor lane having a load end 27 and a transfer end 29, where each conveyor lane 25 includes a conveyor 24 operable to move pouches 20 in a conveyance direction 31 from the load end to the transfer end. The transfer end 29 of each conveyor lane includes a downwardly facing pouch transfer window 33 over which pouches at the transfer end are positioned. A transfer subassembly 14 adjacent the end of each conveyor lane includes, for each lane, a first transfer mechanism 40 and a second transfer mechanism 42. The first transfer mechanism 40 is configured to engage a lower face of a pouch 20, pull at least part of the pouch down through the pouch transfer window and transfer a leading edge the pouch to an infeed point of the second transfer mechanism 42.

Each conveyor 24 includes its own a conveyor drive 26 for selectively effecting movement of the conveyor 24. Each first transfer mechanism 40 includes a drive 50 for selectively effecting horizontal movement of the first transfer mechanism 40 and a second drive 46 for selectively effecting vertical movement of the first transfer mechanism. For each lane, at least one sensor 100 is provided for detecting pouch presence or pouch absence at the transfer end of the conveyor lane. A controller 200 is operatively associated with the conveyor drive 26, the drive 50 and 46 and the sensor 100. The controller 200 is configured to: (i) effect operation of the conveyor drive responsive to detection of pouch absence at the transfer end; (ii) stop the conveyor drive upon detection of pouch presence at the transfer end; and (iii) effect operation of the first drive and the second drive, based at least in part upon detection of pouch presence at the transfer end, so as to pick the pouch by moving the first transfer mechanism (a) into a pick position below the pouch transfer window, (b) then upward into engagement with the lower face, (c) then downward to pull at least part of the pouch down through the pouch transfer window and (d) then horizontally (and in some cases also vertically) toward the infeed point.

Figure 13:
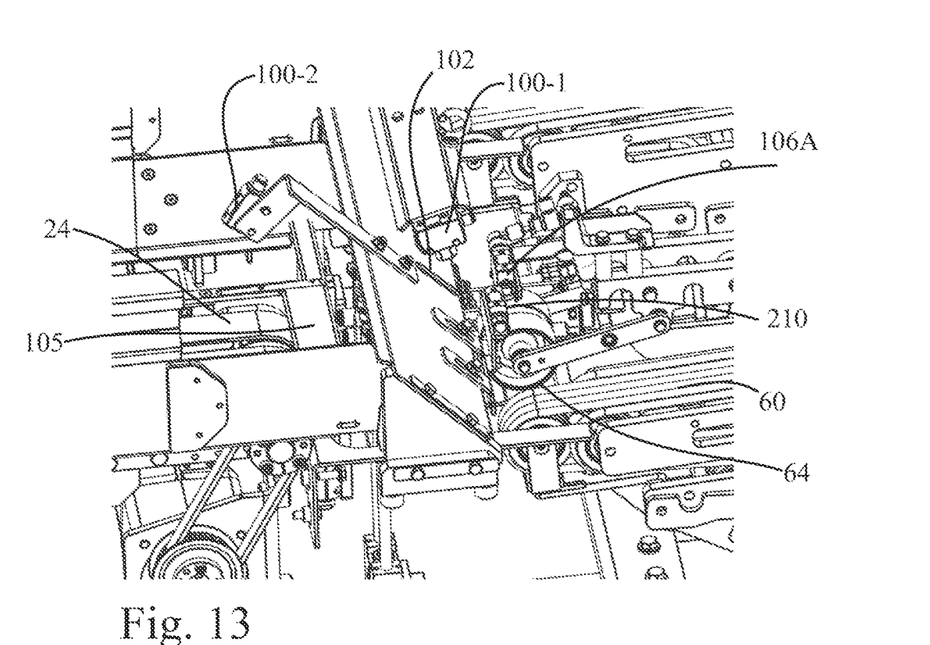
FIGS. 13-15 show views of another embodiment of the transfer end of the conveyor lane.

In one embodiment, the transfer end of each conveyor lane includes a stop gate 36, and, per FIG. 13, the at least one sensor comprises a first sensor 100-1 oriented to detect pouch positioning adjacent a lower portion of the stop gate and a second sensor 100-2 oriented to detect pouch positioning adjacent an upper portion of the stop gate (through slot 102). The second sensor is useful in the case of pouches in which the leading edge is curled upward and cannot be detected by sensor 100-1.

In the described embodiment, each first transfer mechanism 40 includes one or more suction grippers 44. An end point of each conveyor 24 is upstream of the pouch transfer window 33 and the pouch transfer window 33 includes one or more supports 104 for holding the pouch over the transfer window prior to the pouch being pulled down through the pouch transfer window. In the illustrated embodiment, a trailing edge of the pouch is supported by the end of the conveyor 24, and/or by a lateral support 105 at the end of the conveyor, and the leading edge is supported by support tabs that extend rearwardly from the stop gate.

In the illustrated embodiment, each second transfer mechanism 42 includes a further conveyor 60 including a further drive 62. The infeed point includes a pinch roller 64 and a roller position drive 66. Per FIG. 13, one infeed sensor 210 is provided for detecting pouch presence or pouch absence at an infeed side of the pinch roller, and another sensor 106A (alternative position for sensor 106 mentioned above) is provided for detecting pouch presence or pouch absence at an intermediate location below the pinch roller 64 and above the further conveyor 60. The sensor 106A sights down a slot in the pinch roller, or a gap between spaced apart pinch rollers if two are provided. The controller 200 is configured such that the operation of the 50 and 46 so as to pick the pouch is also based upon detection of pouch absence at the infeed side of the pinch roller. In addition, in certain implementations, responsive to detection of pouch presence at the intermediate location, the controller is configured to (i) effect operation of the roller position drive to move the pinch roller downward to engage an upper face of the pouch and push the lower face of the pouch onto the further conveyor, (ii) effect operation of the vertical drive to move the suction gripper downward, (iii) cause the suction gripper to release the lower face of the pouch and (iv) effect operation of the further drive to move the pouch away from the pinch roller. The controller 200 can also be configured to attempt to repick a pouch from the conveyor lane if sensor 210 indicates pouch absence when, in fact, sensor 210 is expected to indicate pouch present (e.g., after an attempted pick and movement toward the infeed point). Similarly, a fault could be generated in such instance, or after a set number of failed pouch picks from the conveyor lane.

Each pouch travel lane also includes an infeed mechanism 16 carrying multiple pouch clamps 76. The infeed mechanism is configured and operable, by controller 200, to position an open clamp 76 at a pickup location, and the further conveyor 60 feeds the pouch to the pickup location such that a leading edge of the pouch is moved into the open clamp. The infeed mechanism is then operable, via controller 200, to close the open clamp onto the pouch and then move the pouch into a vertical orientation at a handoff point to be gripped by clamps 112 of a filling machine.

The described assembly also provides a method of feeding pouches to a filling machine, where the method involves: conveying pouches along a conveyor lane to a transfer end of the conveyor lane, wherein the transfer end includes a downwardly facing pouch transfer opening; supporting a first pouch over the pouch transfer opening; and moving a first transfer mechanism to move upward into engagement with a lower face of the first pouch, the first transfer member gripping the lower face by suction, and then moving the first transfer mechanism downward to pull the first pouch down through the pouch transfer window and into a position below the conveyor lane. The method may also involve moving the first transfer mechanism horizontally and vertically to position a leading edge of the first pouch in a position to be engaged between a pinch roller and a conveyor for further feeding of the first pouch.

The described pouch feeding assembly allows for positioning the pouches, bottom pouch leading, with significant variances in spacing.

As used herein, the term "control system" is broadly used to refer to the controller in combination with the sensors and drives used to control movement of the various parts of the assembly.

It is to be clearly understood that the above description is intended by way of illustration and example only, is not intended to be taken by way of limitation, and that other changes and modifications are possible.

What is claimed is:

1. A pouch feeding assembly, comprising:
 a conveyor lane having a load end and a transfer end, wherein the conveyor lane includes a conveyor operable to move pouches in a conveyance direction from the load end to the transfer end, wherein the transfer end of the conveyor lane includes a downwardly facing pouch transfer window over which pouches at the transfer end are positioned;
 a transfer assembly including a first transfer mechanism and a second transfer mechanism, the first transfer mechanism configured to engage a lower face of a pouch, pull at least part of the pouch down through the pouch transfer window and transfer the pouch to an infeed point of the second transfer mechanism.

2. The pouch feeding assembly of claim 1, further comprising:
 a conveyor drive for selectively effecting movement of the conveyor;
 a first drive for selectively effecting horizontal movement of the first transfer mechanism and a second drive for selectively effecting vertical movement of the first transfer mechanism;
 at least one sensor for detecting pouch presence or pouch absence at the transfer end of the conveyor lane;
 a controller operatively associated with the conveyor drive, the first drive, the second drive and the sensor, wherein the controller is configured to:
 (i) effect operation of the conveyor drive responsive to detection of pouch absence at the transfer end;

(ii) stop the conveyor drive upon detection of pouch presence at the transfer end;

(iii) effect operation of the first drive and the second drive, based at least in part upon detection of pouch presence at the transfer end, so as to pick the pouch by moving the first transfer mechanism (i) into a pick position below the pouch transfer window, (ii) then upward into engagement with the lower face, (iii) then downward to pull at least part of the pouch down through the pouch transfer window and (iv) then horizontally toward the infeed point.

3. The pouch feeding assembly of claim 2, wherein transfer end of the conveyor lane includes a stop gate, wherein the at least one sensor comprises a first sensor oriented to detect pouch positioning adjacent a lower portion of the stop gate and a second sensor oriented to detect pouch positioning adjacent an upper portion of the stop gate.

4. The pouch feeding assembly of claim 2, wherein the first transfer mechanism comprises a suction gripper.

5. The pouch feeding assembly of claim 4, wherein an end point of the conveyor is upstream of the pouch transfer window and the pouch transfer window includes one or more supports for holding the pouch over the transfer window prior to the pouch being pulled down through the pouch transfer window.

6. The pouch feeding assembly of claim 4,
wherein the second transfer mechanism comprises a further conveyor including a further drive,
wherein the infeed point includes a pinch roller and a roller position drive,
a first infeed sensor for detecting pouch presence or pouch absence at an infeed side of the pinch roller;
a second sensor for detecting pouch presence or pouch absence at an intermediate location below the pinch roller and above the further conveyor;
wherein the controller is configured such that the operation of the lateral drive and the vertical drive so as to pick the pouch is also based upon detection of pouch absence at the infeed side of the pinch roller;
wherein, responsive to detection of pouch presence at the intermediate location, the controller is configured to (i) effect operation of the roller position drive to move the pinch roller downward to engage an upper face of the pouch and push the lower face of the pouch onto the further conveyor, (ii) effect operation of the vertical drive to move the suction gripper downward, (iii) cause the suction gripper to release the lower face of the pouch and (iv) effect operation of the further drive to move the pouch away from the pinch roller.

7. The pouch feeding assembly of claim 6, further comprising a vertical transfer subassembly carrying multiple pouch clamps, the vertical transfer subassembly configured and operable to position an open clamp at a pickup location, wherein the further conveyor feeds the pouch to the pickup location such that a leading edge of the pouch is moved into the open clamp, wherein the vertical transfer subassembly is operable to close the open clamp onto the pouch and then move the pouch into a vertical orientation at a handoff point to be gripped by clamps of a filling machine.

8. A pouch feeding assembly, comprising:
a conveyor lane having a load end and a transfer end, wherein the conveyor lane includes a conveyor for moving a pouch in a conveyance direction from the load end to the transfer end, wherein the transfer end of the conveyor lane includes a downwardly facing pouch transfer window;
a transfer assembly including a first transfer mechanism and a second transfer mechanism, the first transfer mechanism comprising pouch picker for engaging a lower face of a pouch, the second transfer mechanism including an infeed point;
a control system operatively connected to operate the conveyor and the first transfer mechanism, the control system configured such that (i) the pouch is moved to the transfer end over the pouch transfer window, (ii) the pouch picker is moved upward into engagement with the lower face of the pouch, (iii) the pouch picker is moved downward to pull at least part of the pouch down through the pouch transfer window and (iv) the pouch picker is moved laterally to move the pouch to the infeed point of the second transfer mechanism.

9. The pouch feeding assembly of claim 8, wherein the pouch picker comprises a suction gripper, the second transfer mechanism comprises a further conveyor with a further drive, and the control system is configured such that the suction gripper releases the pouch as the pouch is transferred onto the further conveyor.

10. A method of feeding pouches to a filling machine, the method comprising:
conveying pouches along a conveyor lane to a transfer end of the conveyor lane, wherein the transfer end includes a downwardly facing pouch transfer opening;
supporting a first pouch over the pouch transfer opening;
moving a first transfer mechanism to move upward into engagement with a lower face of the first pouch, the first transfer member gripping the lower face by suction, and then moving the first transfer mechanism downward to pull at least part of the first pouch down through the pouch transfer window and into a position below the conveyor lane.

11. The method of claim 10, further comprising:
moving the first transfer mechanism horizontally and vertically to position a leading edge of the first pouch in a position to be engaged between a pinch roller and a conveyor for further feeding of the first pouch.

* * * * *